(12) United States Patent
Kim et al.

(10) Patent No.: US 10,199,839 B2
(45) Date of Patent: Feb. 5, 2019

(54) BATTERY PACK

(71) Applicant: SAMSUNG SDI CO., LTD., Yongin-si, Gyeonggi-do (KR)

(72) Inventors: Jae Min Kim, Yongin-si (KR); Dae Yon Moon, Yongin-si (KR); Byung Kook Ahn, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 47 days.

(21) Appl. No.: 15/348,799

(22) Filed: Nov. 10, 2016

(65) Prior Publication Data

US 2017/0155257 A1    Jun. 1, 2017

(30) Foreign Application Priority Data

Nov. 30, 2015  (KR) ........................ 10-2015-0168836

(51) Int. Cl.
  *H02J 7/00*   (2006.01)
  *H01M 10/42*  (2006.01)
  *H01M 2/10*   (2006.01)
  *H01M 2/20*   (2006.01)

(52) U.S. Cl.
  CPC ......... *H02J 7/0026* (2013.01); *H01M 2/1061* (2013.01); *H01M 2/204* (2013.01); *H01M 10/425* (2013.01); *H01M 2010/4271* (2013.01)

(58) Field of Classification Search
  CPC .... H02J 7/0026; H01M 2/204; H01M 2/1061; H01M 10/425

USPC .............................. 320/107, 112, 134; 429/7
See application file for complete search history.

(56) References Cited

U.S. PATENT DOCUMENTS

| 8,835,045 | B2 | 9/2014 | Pyo | |
| 8,852,790 | B2 | 10/2014 | Moom | |
| 2014/0099519 | A1* | 4/2014 | Hong | H01M 2/105 429/7 |
| 2015/0044511 | A1 | 2/2015 | Kim et al. | |

FOREIGN PATENT DOCUMENTS

| KR | 10-2010-0082530 A | 7/2010 |
| KR | 10-1274923 B1 | 6/2013 |
| KR | 10-2015-0018412 A | 2/2015 |

* cited by examiner

*Primary Examiner* — Edward Tso
*Assistant Examiner* — Aaron Piggush
(74) *Attorney, Agent, or Firm* — Lewis Roca Rothgerber Christie LLP

(57) ABSTRACT

A battery pack includes one or more battery cells including at one side electrode tabs of different polarities, the electrode tabs distanced from each other in a first direction and each protruding in a second direction transverse to the first direction; and a protective circuit module connected to the one side of the one or more battery cells to control charging/discharging of the one or more battery cells, and the protective circuit module is arranged to be superposed on the one or more battery cells.

11 Claims, 7 Drawing Sheets

BATTERY PACK

CROSS-REFERENCE TO RELATED APPLICATION

This application claims priority to and the benefit of Korean Patent Application No. 10-2015-0168836, filed on Nov. 30, 2015 in the Korean Intellectual Property Office, the entire content of which is incorporated herein by reference.

BACKGROUND

1. Field

Aspects of embodiments of the present invention relate to a battery pack.

2. Description of Related Art

Generally, a secondary battery is a battery that may be charged and discharged, and may thus be used repeatedly. Especially, a lithium secondary battery has high energy density and operating voltage, and excellent preservation and life expectancy characteristics, and is thus being widely used as an energy source for various kinds of electronic products.

However, there are various combustible materials embedded inside a lithium secondary battery, and thus a lithium secondary battery has a risk of heating and explosion due to overcharge, overcurrent, other physical external impact, and the like. Therefore, as a safety device that could effectively control such risks, a positive temperature coefficient (PTC) device, a protective circuit module (PCM), and/or the like may be mounted onto a battery cell.

However, the structure and process of a conventional connection method between a PCM and a battery cell is complicated and therefore increases the manufacturing cost, which is a problem.

SUMMARY

According to aspects of embodiments of the present invention, a battery pack has an optimized or improved structure of connection between a PCM and a battery cell, and may therefore reduce a manufacturing cost.

Other aspects of embodiments of the present disclosure may be derived by those skilled in the art through the description of some exemplary embodiments described herein.

According to one or more embodiments of the present disclosure, a battery pack includes one or more battery cells including at one side electrode tabs of different polarities, the electrode tabs distanced from each other in a first direction and each protruding in a second direction transverse to the first direction; and a protective circuit module connected to the one side of the one or more battery cells to control charging/discharging of the one or more battery cells, and the protective circuit module is arranged to be superposed on the one or more battery cells.

The protective circuit module may include a base unit extending in the first direction, and a protective circuit device mounted on the base unit, one or more insertion holes formed in the base unit, and the protective circuit module may be connected to the one side of the one or more battery cells through the one or more insertion holes.

The base unit of the protective circuit module may be arranged to be superposed on the one or more battery cells.

The one or more battery cells may include a connecting tab connected to one of the electrode tabs and including at one side of the connecting tab a protruding unit standing in a third direction transverse to each of the first and second directions, and the protective circuit module may be connected to the one side of the one or more battery cells through the protruding unit inserted into and fixated to an insertion hole of the one or more insertion holes.

A size of the insertion hole may be greater than a size of the protruding unit, and the protruding unit may be inserted into the insertion hole and is fixated therein by soldering.

The connecting tab may further include a first plate welded to the one of the electrode tabs, and a second plate connected to an end of the first plate and arranged to face the first plate such that the one of the electrode tabs is between the second plate and the first plate, the protruding unit extending in the third direction from a side of the first plate or the second plate.

The one of the electrode tabs may be a cathode tab.

A battery cell of the one or more battery cells may further include an exterior material configured to accommodate an electrode assembly inside thereof and to form a terrace from which the electrode tabs electrically connected with the electrode assembly protrude, the electrode tabs protruding in the second direction and bent to be placed on the terrace so as to arrange the connecting tab connected to the electrode tabs on the terrace.

The protruding unit may extend in the third direction from one side of the second plate, and the connecting tab may be bent such that the first plate is welded to one surface of the one electrode tab protruding in the second direction with the first plate and second plate unbent, and the second plate is bent to face the first plate and the one electrode tab is bent to be placed on the terrace, such that the one electrode tab is between the first plate and second plate and is arranged on the terrace.

The base unit of the protective circuit module may be arranged on the terrace.

The base unit may be arranged where the connecting tab connected to the one electrode tab is arranged on the terrace and the insertion hole is formed to which the protruding unit is inserted and fixated.

According to an aspect of embodiments of the present disclosure, an advantage of optimizing or improving the structure of connection between a PCM and a battery cell is realized, thereby reducing the manufacturing cost of a battery pack.

Furthermore, according to another aspect of embodiments of the present disclosure, an advantage in terms of battery pack electric resistance is realized by minimizing or reducing the distance of connection between a PCM and a battery cell.

Furthermore, according to another aspect of embodiments of the present disclosure, an advantage of minimizing or reducing the welding loss of an electrode tab when manufacturing a battery pack is realized.

BRIEF DESCRIPTION OF THE DRAWINGS

Some example embodiments will be described more fully hereinafter with reference to the accompanying drawings; however, embodiments of the present invention may be embodied in different forms and should not be construed as limited to the embodiments set forth herein. Rather, these embodiments are provided so that this disclosure will fully convey the scope of the present invention to those skilled in the art.

In the drawing figures, dimensions may be exaggerated for clarity of illustration. It will be understood that when an element is referred to as being "between" two elements, it

DETAILED DESCRIPTION

Figure 1A:
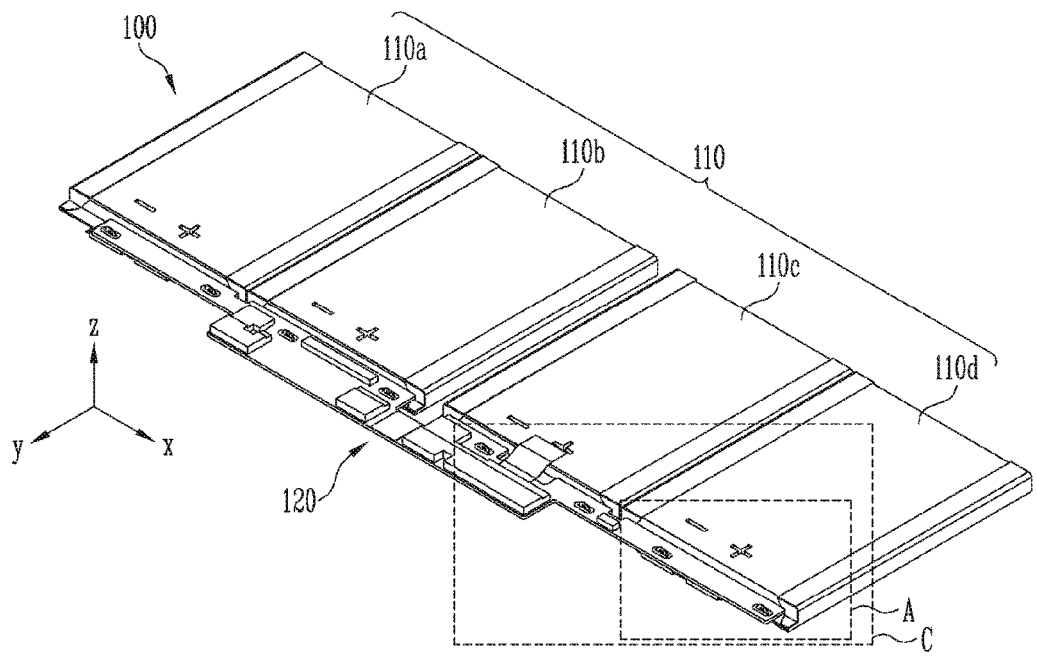
FIG. 1A is a perspective view of a battery pack according to an embodiment of the present disclosure.

Hereinafter, some embodiments will be described in further detail with reference to the accompanying drawings. Embodiments may be described herein with reference to cross-sectional illustrations that are schematic illustrations of embodiments, and intermediate structures. As such, variations from the shapes of the illustrations, as a result, for example, of manufacturing techniques and/or tolerances, are to be understood. Thus, embodiments should not be construed as limited to the particular shapes of regions illustrated herein, but may include deviations in shapes that result, for example, from manufacturing. In the drawings, lengths and sizes of layers and regions may be exaggerated for clarity. Like reference numerals in the drawings denote like elements.

Terms such as "first" and "second" may be used to describe various components, but are not intended to limit the various components. Rather, these terms are used for the purpose of differentiating a component from other components. For example, a first component may be referred to as a second component, and a second component may be referred to as a first component, and so forth, without departing from the spirit and scope of the present invention. Furthermore, "and/or" may include any one of or a combination of the components mentioned.

Furthermore, "connected/accessed" represents that one component may be directly connected or accessed to another component or indirectly connected or accessed through another component.

In this specification, a singular form may include a plural form as long as it is not specifically mentioned otherwise in a sentence. Furthermore, "include/comprise" or "including/comprising" used in the specification represents that one or more components, steps, operations, and/or elements may exist or may be added.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art.

Hereinafter, some embodiments of the present disclosure will be explained in further detail with reference to the accompanying drawings.

Figure 1B:
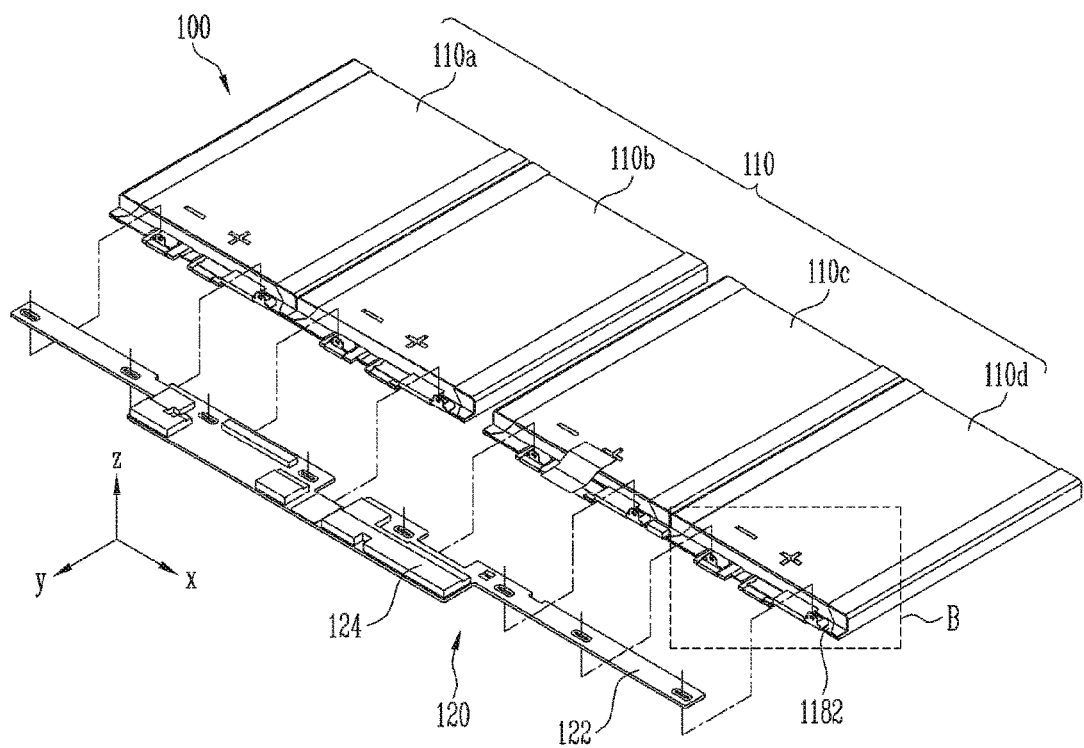
FIG. 1B is a perspective view illustrating a state where a PCM has been separated from a plurality of battery cells included in the battery pack of FIG. 1A.

FIG. 1A is a perspective view of a battery pack 100 according to an embodiment of the present disclosure; and FIG. 1B is a perspective view illustrating a state in which a PCM 120 is separated from a plurality of battery cells 110a, 110b, 110c, 110d included in the battery pack 100.

Figure 2:
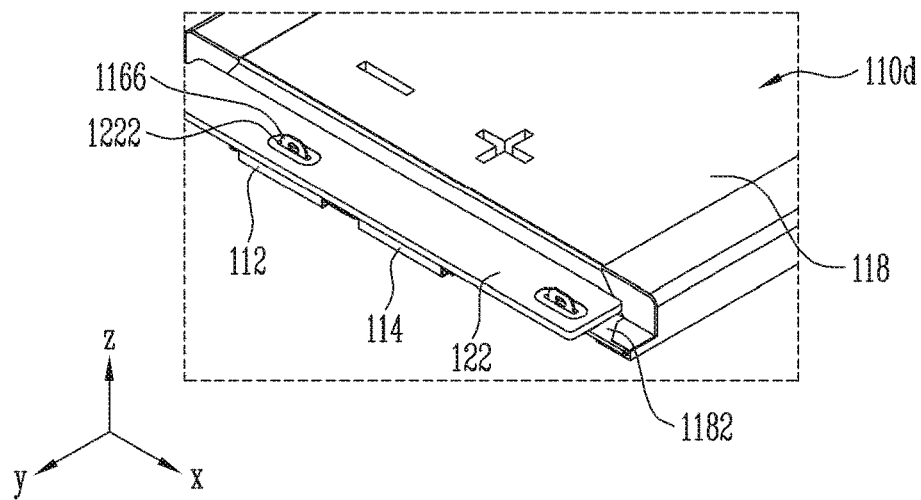
FIG. 2 is an enlarged view of a region "A" of FIG. 1A illustrating a state in which a PCM is bonded to a plurality of battery cells, according to an embodiment of the present disclosure.

FIG. 2 is an enlarged view of a region "A" of FIG. 1A illustrating a state in which the PCM 120 is bonded to the plurality of battery cells according to an embodiment of the present disclosure.

Figure 3:
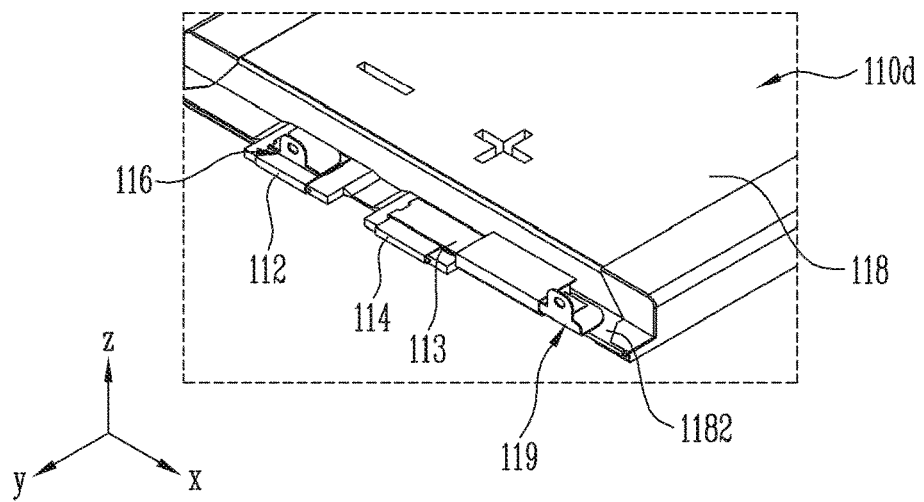
FIG. 3 is an enlarged view of a region "B" of FIG. 1B illustrating a structure of a battery cell according to an embodiment of the present disclosure.

FIG. 3 is an enlarged view of a region "B" of FIG. 1B illustrating a structure of a battery cell according to an embodiment of the present disclosure.

As illustrated in FIGS. 1A to 3, the battery pack 100 according to an embodiment of the present disclosure includes the plurality of battery cells 110a, 110b, 110c, 110d and the protective circuit module (PCM) 120 that controls charging and discharging of the plurality of battery cells.

In a conventional battery pack, a PCM may be connected to a battery cell in a soldering method having a cover ray as medium. That is, the cover ray is soldered to an electrode tab of the PCM and thus connected, and then the PCM is connected to the battery cell in a manner of soldering the cover ray to an electrode terminal of the battery cell, thereby manufacturing a battery pack. However, such a connecting method requires a plurality of cover rays having different shapes, and thus the structure and process is complicated, thereby increasing the manufacturing cost.

Furthermore, in another conventional battery pack, a PCM may be connected to a battery cell in a welding method having a conductive nickel plate as medium. That is, a nickel plate may be welded to a nickel tab of the PCM to connect to the PCM, and then the nickel plate may be welded to an electrode terminal of the battery cell so as to connect the PCM to the battery cell and manufacture a battery pack. However, such a case requires additional components such as a nickel tab, and thus the structure and process is complicated, thereby increasing the manufacturing cost.

According to embodiments of the present disclosure, a battery pack includes a structure of connection wherein a PCM is directly connected to one side of a plurality of battery cells.

First, each of the plurality of battery cells 110a, 110b, 110c, 110d according to an embodiment of the present disclosure may be a secondary battery that may be charged/discharged.

Herein, the plurality of battery cells may each have a same structure, and thus for the sake of explanation, the following description will be made with respect to the battery cell 110d. Furthermore, although the present disclosure is based on an embodiment in which there are four battery cells, embodiments of the present invention are not limited thereto.

The battery cell 110d may include an electrode assembly (not illustrated), and first and second electrode tabs 112, 114 electrically connected to the electrode assembly.

The electrode assembly may be manufactured by disposing a separator between a first electrode and a second electrode to form a laminate, and then winding, wherein the first electrode tab 112 is electrically connected to the first electrode to protrude outside the battery cell 110d, and the second electrode tab 114 is electrically connected to the second electrode to protrude outside the battery cell 110d. Herein, according to one embodiment, the first electrode may be a cathode, the second electrode may be an anode, and the first electrode tab of the cathode may be made of nickel, and the second electrode tab of the anode may be made of aluminum.

Herein, the first and second electrode tabs 112, 114 may be distanced from each other in a first direction (e.g., an x direction), and may each protrude in a second direction (e.g., a y direction) that is transverse to the first direction and be provided on one side of the battery cell 110d. The second direction may be perpendicular to the first direction.

Furthermore, as will be explained hereinafter, each of the first and second electrode tabs 112, 114 may protrude in the second direction, but may at the same time be bent, such as bent and placed on a terrace 1182 to be connectable with another component, such as a PCM, for example. In an embodiment, for example, each of the first and second electrode tabs 112, 114 may extend from the terrace 1182 in the second direction, and may be bent once such as to extend in a direction opposite to the second direction and then be placed on the terrace 1182.

The battery cell 110d may include an exterior material 118 that accommodates the electrode assembly inside thereof and that forms the terrace 1182 from which the first and second electrode tabs 112, 114 electrically connected to the electrode assembly protrude.

In an embodiment, the exterior material 118 has an approximately hexahedron shape, and includes a periphery having two relatively broader surfaces and four relatively smaller surfaces that connect the two relatively broader surfaces. Of the surfaces of the periphery, a surface having the electrode tabs may be a terminal surface, an opposite surface may be a bottom surface, and a surface between the terminal surface and the bottom surface may be a side surface, the terrace 1182 is formed to be adjacent to the terminal surface, thereby providing a space for the protrusion of the first and second electrode tabs 112, 114.

The battery cell 110d may further include a connecting tab 116 that facilitates direct connection with the PCM 120.

The connecting tab 116 may be connected to each of the first and second electrode tabs 112, 114, and as will be explained hereinafter, the battery cell 110d and the PCM 120 are connected to each other in such a manner that a protruding unit or protruding portion 1166 is inserted into and fixed to an insertion hole 1222 of the PCM 120. The connection structure between the battery cell 110d and the PCM 120 by the connecting tab 116 will be explained in further detail hereinafter.

The PCM 120 according to an embodiment of the present disclosure is connected at one side of the battery cell 110d and controls charge/discharge of the battery cell 110d. For this purpose, as illustrated in FIG. 1A to FIG. 3, the PCM 120 is arranged to be superposed on one side of the battery cell 110d. That is, the PCM 120 is arranged to be superposed with the terrace 1182 formed on one side of the battery cell 110d, and is thus directly connected to the one side of the battery cell 110d.

As will be explained hereinafter, the PCM 120 may include a base unit 122 that extends in the first direction (e.g., the x direction), and a protective circuit device 124 mounted on the base unit 122. According to an embodiment of the present disclosure, as the base unit 122 of the PCM 120 is arranged to be superposed with the terrace 1182, the PCM 120 may be directly connected to one side of the battery cell 110d.

As illustrated in FIG. 1A and FIG. 1B, according to an embodiment, the base unit 122 extends in the first direction over an entirety of the plurality of battery cells 110a, 110b, 110c, 110d, and the protective circuit device 124 is mounted on a portion of the base unit 122.

For example, the protective circuit device 124 may be mounted on an area over a portion of the battery cells 110b, 110c on the base unit 122 that extends in the first direction over the entirety of the plurality of battery cells 110a, 110b, 110c, 110d. In this case, the protective circuit device 124 may be mounted on the base unit 122 but also on an area that is not superposed with the terrace 1182.

The base unit 122, according to an embodiment, may be a printed circuit board (PCB).

Figure 4A:
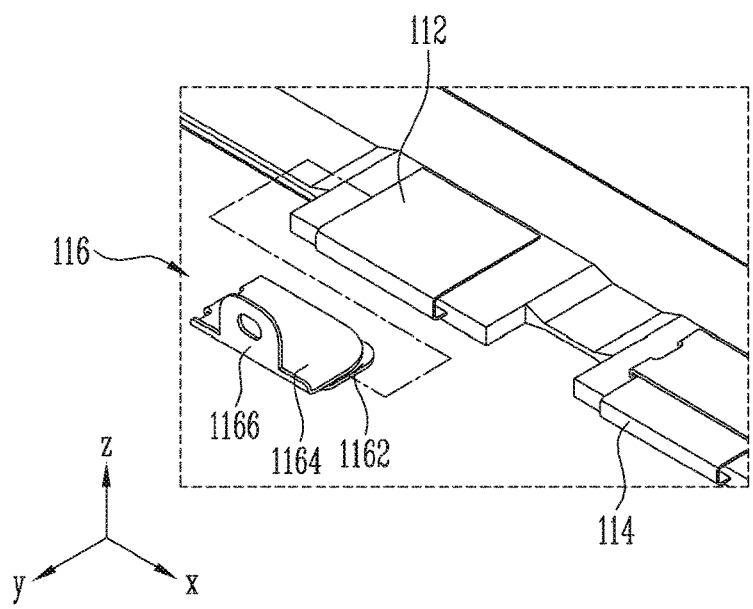
FIG. 4A is a view illustrating a connecting tab before it is connected to one of a plurality of electrode tabs, according to an embodiment of the present disclosure.
Figure 4B:
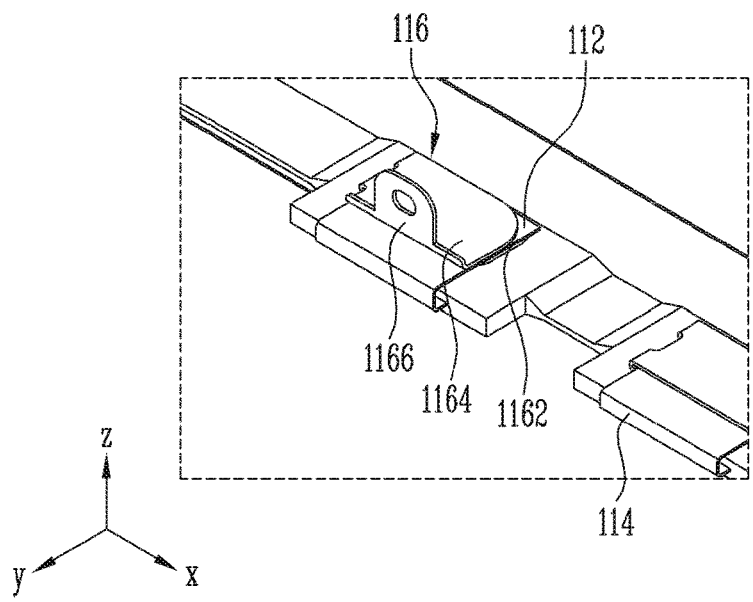
FIG. 4B is a view illustrating the connecting tab of FIG. 4A after it is connected to one of a plurality of electrode tabs, according to an embodiment of the present disclosure.

FIG. 4A is a view illustrating the connecting tab 116 before it is connected to one of the first and second electrode tabs 112, 114 according to an embodiment of the present disclosure; and FIG. 4B is a view illustrating the connecting tab 116 after it is connected to one of the first and second electrode tabs 112, 114 according to an embodiment of the present disclosure.

Figure 4C:
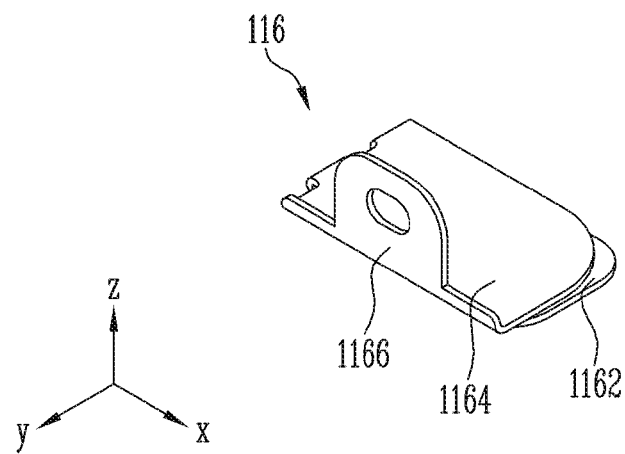
FIG. 4C is a perspective view of a connecting tab, seen from one side, according to an embodiment of the present disclosure.
Figure 4D:
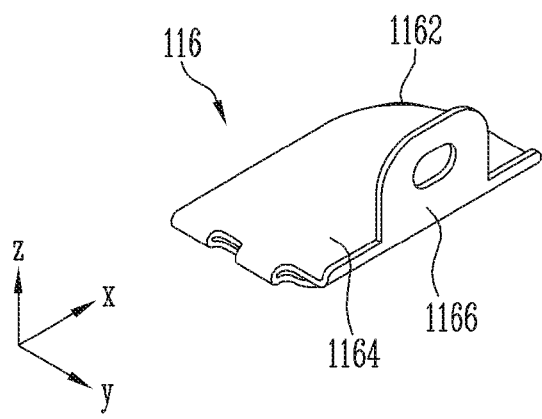
FIG. 4D is a perspective view of the connecting tab of FIG. 4C, seen from another side.

Furthermore, FIG. 4C is a perspective view of the connecting tab 116 according to an embodiment of the present disclosure seen from one side; and FIG. 4D is a perspective view of the connecting tab 116 according to an embodiment of the present disclosure seen from another side.

The connecting tab 116 according to an embodiment of the present disclosure may be applied to both the first and second electrode tabs 112, 114, and in particular, the connecting tab 116 according to an embodiment of the present disclosure may be efficiently applied to the first electrode tab 112 of nickel material, that is, to the cathode tab, and thus, hereinafter, explanation will be made with a main focus on the first electrode tab, or cathode tab 112.

As illustrated in FIGS. 4A to 4D, the connecting tab 116 may include a first plate 1162, a second plate 1164, and the protruding unit 1166.

The first plate 1162 may be bonded to the cathode tab 112 in a welding method.

The second plate 1164 is connected to one end of the first plate 1162 and is arranged to face the first plate 1162 so as to dispose the cathode tab 112 between the second plate 1164 and the first plate 1162.

For this purpose, the second plate 1164 according to an embodiment of the present disclosure extends from one end of the first plate 1162 in a direction opposite to the first direction, but may at the same time be bent once to face the first plate 1162 and extend in the first direction. That is, the first plate 1162 and second plate 1164 may be connected to each other through a bent unit, or bent portion, that is bent once.

The protruding unit 1166 has a structure of standing or extending in a third direction (e.g., a z direction) that is transverse to each of the first and second directions from one side of the second plate 1164. The third direction may be a direction that is perpendicular to each of the first and second directions.

Hereinafter, explanation will be made of a process of the connecting tab 116 of the aforementioned structure being connected to the cathode tab 112 with reference to FIGS. 5A to 5D.

FIGS. 5A to 5D are views showing a process of the connecting tab 116 according to an embodiment of the present disclosure being connected to one of the first and second electrode tabs 112, 114.

First, as illustrated in FIGS. 5A to 5D, the cathode tab 112 exists in a state of protruding in the second direction (before being bent to be placed on the terrace 1182, that is not bent). Furthermore, the connecting tab 116 exists such that the first plate 1162 and the second plate 1164 face each other and are not bent. Herein, the protruding unit 1166 may exist by standing in the third direction from one side of the second plate 1164.

Figure 5A:
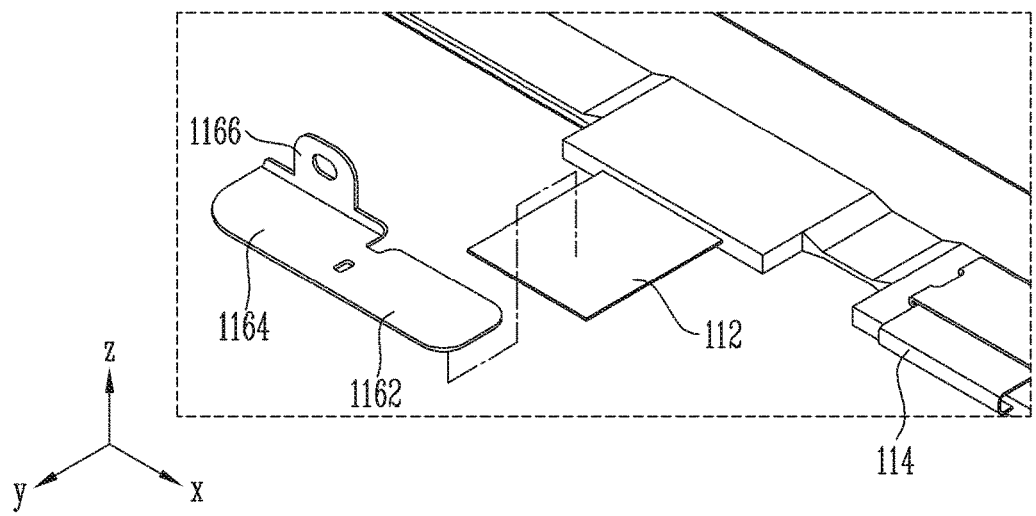
FIGS. 5A to 5D are views illustrating a process of a connecting tab being connected to one of a plurality of electrode tabs, according to an embodiment of the present disclosure.
Figure 5B:
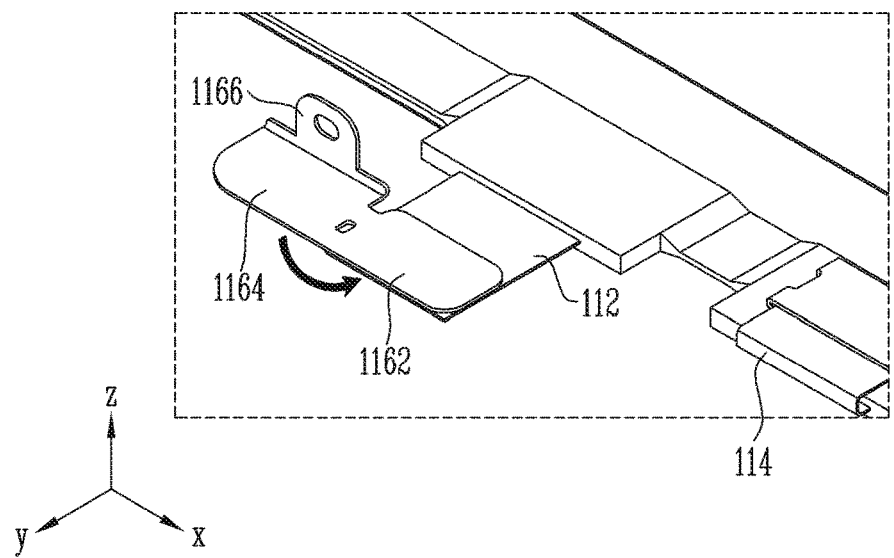

Next, as illustrated in FIG. 5B, the first plate 1162 is bonded on one surface of the cathode tab 112 in a method such as welding. Herein, the connecting tab 116 may be disposed on a jig to be welded to the cathode tab 112, and according to an embodiment of the present disclosure, the second plate 1164 of the connecting tab 116 may perform a role of a placement on the jig. That is, the second plate 1164 may be fixated on the jig by a separate fixing member (for example, a magnet or the like), and the first plate 1162 connected by the second plate 1164 may be stably welded on one surface of the cathode tab 112. That is, the first plate 1162 may be a portion being welded, and the second plate 1164 may be a portion being fixated on the jig.

If a connecting tab has only a first plate without a second plate, a protruding unit for connection with a PCM may exist on the first plate, in which case, on the first plate that is the portion being welded, the protruding unit exists together, and thus a problem may occur that the connecting tab cannot be fixated on a jig. Furthermore, in the case where the protruding unit exists on the first plate corresponding to the welding portion, welding loss may occur by interference between the protruding unit and a welding rod, which is a problem.

Thus, the connecting tab 116 according to an embodiment of the present disclosure is provided with the first plate 1162 corresponding to the welding portion and the second plate 1164 corresponding to a portion for fixating on a jig, and the protruding unit 1166 of a standing structure is located on the second plate 1164 for connection with the PCM 120 such that the connecting tab 116 may be welded more stably than the cathode tab 112, and a welding loss may be minimized or reduced.

According to an embodiment, unlike the anode tab made of aluminum, the cathode tab made of nickel material has relatively more excellent weldability, and thus sufficient bonding force is obtained even if the first plate 1162 of the connecting tab 116 is welded to one surface of the cathode tab (that is, it is not necessary that both the first plate 1162 and second plate 1164 be welded to both surfaces of the electrode tab). Thus, without the need for the second plate 1164 to be welded to the electrode tab, it is possible to provide a space for fixing with the jig and a space for forming a protruding unit of a standing structure for connection with the PCM 120.

Figure 5C:
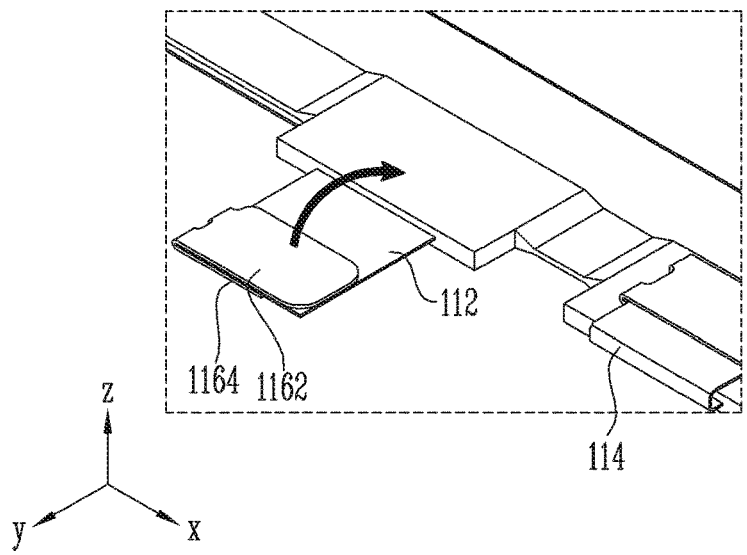
Figure 5D:
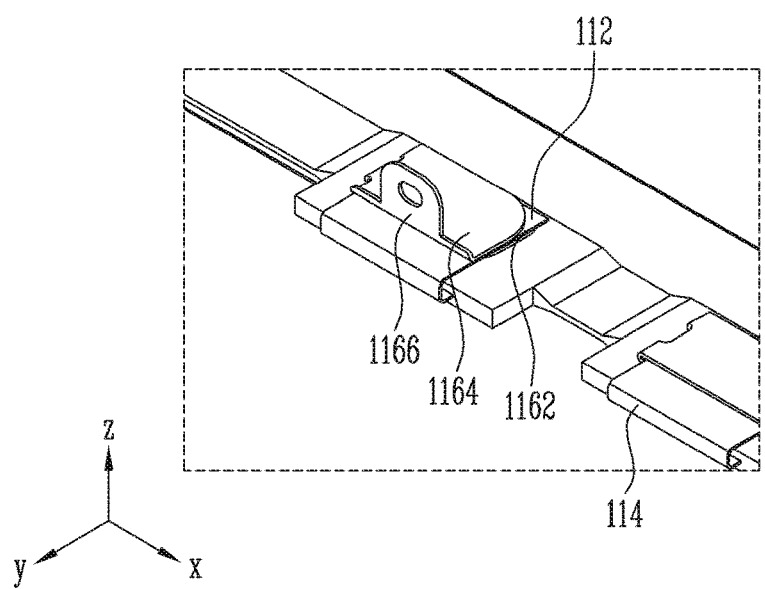

As illustrated in FIG. 5C and FIG. 5D, the second plate 1164 is bent to face the first plate 1162, such that the cathode tab 112 is disposed between the first plate 1162 and the second plate 1164, and the cathode tab 112 is bent to be placed on the terrace 1182. Accordingly, not only the cathode tab 112, but also the connecting tab 116 connected thereto, is placed on the terrace 1182.

In addition, the protruding unit 1166 of the connecting tab 116 arranged on the terrace 1182 as aforementioned has a structure of standing in the third direction on the terrace 1182, and thus on the terrace 1182, the base unit 122 of the PCM 120 may stably bond with the protruding unit 1166 through the insertion hole 1222 formed thereon.

Hereinafter, the configuration of the connecting tab 116 providing the connection between the PCM 120 and battery cell 110d will be explained in further detail with reference to FIG. 6.

Figure 6:
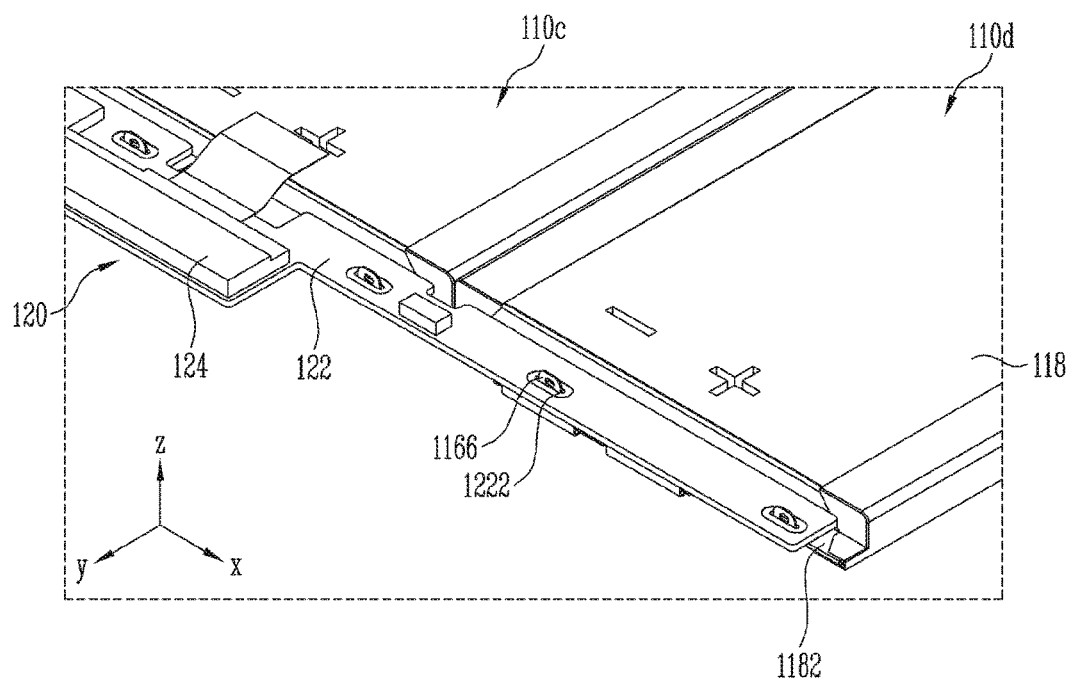
FIG. 6 is an enlarged view of a region "C" of FIG. 1A illustrating a structure of a connection between a PCM and a battery cell, according to an embodiment of the present disclosure.

FIG. 6 is an enlarged view of a region "C" of FIG. 1A illustrating the connecting structure between the PCM 120 and battery cell 110d according to an embodiment of the present disclosure.

As illustrated in FIG. 6, the PCM 120 includes the base unit 122 extending in the first direction (e.g., the x direction) and the protective circuit device 124 mounted on the base unit 122, and one or more insertion holes 1222 are formed on the base unit 122, and the PCM 120 is connected to one side of the battery cell 110d through the protruding unit 1166 inserted into and fixated to the insertion hole 1222.

More specifically, the protruding unit 1166 of the connecting tab 116 is inserted into and fixated to the insertion hole 1222 formed on the base unit 122 of the PCM 120, thereby connecting the PCM 120 and battery cell 110d.

According to an embodiment of the present disclosure, the size of the insertion hole 1222 is larger than the size of the protruding unit 1166 such that the protruding unit 1166 may be easily inserted into the insertion hole 1222, and then may be fixated, such as by soldering.

According to an embodiment, as the electrode tab 112 is bent to be placed on the terrace 1182, the connecting tab 116 connected to the electrode tab 112 is placed on the terrace 1182, and the protruding unit 1166 of the connecting tab 116 has a structure of standing in the third direction on the terrace 1182, and thus the base unit 122 where the insertion hole 1222 is formed is placed on the terrace 1182 to combine with the protruding unit 1166.

That is, the connecting tab 116 connected to the electrode tab 112 is arranged on the terrace 1182 and the base unit 122 is arranged on the connecting tab 116, thereby combining the insertion hole 1222 of the base unit 122 and the protruding unit 1166 of the connecting tab 116 on the terrace 1182.

This enables the base unit 122 of the PCM 120 to be superposed on one side of the battery cell 110, that is, on the terrace 1182.

As aforementioned, according to an embodiment of the present disclosure, the connection between the PCM 120 and battery cell 110d by the connecting tab 116 is performed on the terrace 1182 of the battery cell 110d, thereby optimizing or improving the connecting structure and accordingly making the overall size of the battery pack 100 compact.

This enables the manufacturing cost of the battery pack 100 to be reduced, and minimizes or reduces the connection distance between the PCM 120 and the battery cell, thereby providing an advantage in terms of electric resistance.

Meanwhile, the aforementioned description was made with a main focus on the connecting tab 116 connected to the cathode tab 112, but a connecting tab of a same structure may be applied to an anode tab, that is, the second electrode tab 114.

However, since the anode tab made of aluminum has decreased weldability compared to the cathode tab made of nickel, and thus, in order to obtain sufficient bonding force, welding may be made on both surfaces of the anode tab, and for this purpose, as illustrated in FIG. 3, an additional connecting member 113 may provide the connection between the second electrode tab or anode tab 114 and a connecting tab 119 at the anode side.

That is, according to an embodiment, as the additional connecting member 113 is arranged such that it surrounds both surfaces of the anode tab 114 and is welded on both surfaces of the anode tab 114, and the connecting tab 119 is bonded to the connecting member 113, another protruding unit for connection with the PCM 120 may be provided.

In an embodiment, the anode tab 114 and the additional connecting member 113 are welded to each other independently from the connecting tab 119, and thus the problem of providing space for a mounting jig and the problem of welding loss by the protruding unit do not occur, and, therefore, the connecting tab 119 at the anode side may consist of not two plates of the first and second plates but only one plate according to the connecting tab 116 at the cathode side.

Some example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims and equivalents thereof.

What is claimed is:

1. A battery pack comprising:
one or more battery cells, each including at one side a terrace portion, electrode tabs of different polarities, the electrode tabs distanced from each other in a first direction and each protruding from the terrace portion in a second direction transverse to the first direction, and a connecting tab connected to an electrode tab of the electrode tabs; and
a protective circuit module connected to the connecting tab of the one side of the one or more battery cells to control charging/discharging of the one or more battery cells,
wherein the protective circuit module is arranged to be superposed on the connecting tab and the terrace portion of the one or more battery cells.

2. The battery pack according to claim 1,
wherein the protective circuit module comprises a base unit extending in the first direction, and a protective circuit device mounted on the base unit, one or more insertion holes formed in the base unit, and
wherein the protective circuit module is connected to the one side of the one or more battery cells through the one or more insertion holes.

3. The battery pack according to claim 2, wherein the base unit of the protective circuit module is arranged to be superposed on the one or more battery cells.

4. The battery pack according to claim 2,
wherein the connecting tab comprises at one side of the connecting tab a protruding unit standing in a third direction transverse to each of the first and second directions, and
wherein the protective circuit module is connected to the one side of the one or more battery cells through the protruding unit inserted into and fixated to an insertion hole of the one or more insertion holes.

5. The battery pack according to claim 4,
wherein a size of the insertion hole is greater than a size of the protruding unit, and
wherein the protruding unit is inserted into the insertion hole and is fixated therein by soldering.

6. A battery pack comprising:
one or more battery cells including at one side electrode tabs of different polarities, the electrode tabs distanced from each other in a first direction and each protruding in a second direction transverse to the first direction; and
a protective circuit module connected to the one side of the one or more battery cells to control charging/discharging of the one or more battery cells,
wherein the protective circuit module is arranged to be superposed on the one or more battery cells,
wherein the protective circuit module comprises a base unit extending in the first direction, and a protective circuit device mounted on the base unit, one or more insertion holes formed in the base unit,
wherein the protective circuit module is connected to the one side of the one or more battery cells through the one or more insertion holes,
wherein the one or more battery cells comprise a connecting tab connected to one of the electrode tabs and comprising at one side of the connecting tab a protruding unit standing in a third direction transverse to each of the first and second directions,
wherein the protective circuit module is connected to the one side of the one or more battery cells through the protruding unit inserted into and fixated to an insertion hole of the one or more insertion holes, and
wherein the connecting tab further comprises a first plate welded to the one of the electrode tabs, and a second plate connected to an end of the first plate and arranged to face the first plate such that the one of the electrode tabs is between the second plate and the first plate, the protruding unit extending in the third direction from a side of the first plate or the second plate.

7. The battery pack according to claim 6, wherein the one of the electrode tabs is a cathode tab.

8. The battery pack according to claim 7, wherein a battery cell of the one or more battery cells further comprises an exterior material configured to accommodate an electrode assembly inside thereof and to form a terrace from which the electrode tabs electrically connected with the electrode assembly protrude, the electrode tabs protruding in the second direction and bent to be placed on the terrace so as to arrange the connecting tab connected to the electrode tabs on the terrace.

9. The battery pack according to claim 8,
wherein the protruding unit extends in the third direction from one side of the second plate, and
wherein the connecting tab is bent such that the first plate is welded to one surface of the one electrode tab protruding in the second direction with the first plate and second plate unbent, and the second plate is bent to face the first plate and the one electrode tab is bent to be placed on the terrace, such that the one electrode tab is between the first plate and second plate and is arranged on the terrace.

10. The battery pack according to claim 9, wherein the base unit of the protective circuit module is arranged on the terrace.

11. The battery pack according to claim 10, wherein the connecting tab connected to the one electrode tab is arranged on the terrace, and wherein the base unit having the insertion hole to which the protruding unit is inserted and fixed is arranged on the connecting tab.

\* \* \* \* \*